(12) United States Patent
Oda

(10) Patent No.: US 7,680,850 B2
(45) Date of Patent: Mar. 16, 2010

(54) COMPUTER-READABLE RECORDING MEDIUM STORING INFORMATION SEARCH PROGRAM, INFORMATION SEARCH METHOD, AND INFORMATION SEARCH SYSTEM

(75) Inventor: Mitsuru Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 358 days.

(21) Appl. No.: 11/497,759

(22) Filed: Aug. 2, 2006

(65) Prior Publication Data

US 2007/0233676 A1 Oct. 4, 2007

(30) Foreign Application Priority Data

Mar. 31, 2006 (JP) ............................. 2006-097252

(51) Int. Cl.
*G06F 17/30* (2006.01)
(52) U.S. Cl. ................. 707/706; 707/725; 707/736; 707/741; 707/746; 707/758
(58) Field of Classification Search ............ 707/3, 707/6, 1, 7, 104.1
See application file for complete search history.

(56) References Cited

U.S. PATENT DOCUMENTS

| | | | | |
|---|---|---|---|---|
| 5,572,728 A * | 11/1996 | Tada et al. | ................... | 707/200 |
| 5,765,154 A * | 6/1998 | Horikiri et al. | ................ | 707/10 |
| 5,983,221 A * | 11/1999 | Christy | .......................... | 707/5 |
| 6,366,956 B1 * | 4/2002 | Krishnan | .................... | 709/223 |
| 6,466,237 B1 * | 10/2002 | Miyao et al. | ................ | 715/838 |
| 7,017,120 B2 * | 3/2006 | Shnier | ........................ | 715/783 |
| 7,054,867 B2 * | 5/2006 | Bosley et al. | ................. | 707/10 |
| 7,058,624 B2 * | 6/2006 | Masters | .......................... | 707/3 |
| 7,080,392 B1 * | 7/2006 | Geshwind | .................... | 725/34 |
| 7,376,642 B2 * | 5/2008 | Nayak et al. | ................... | 707/3 |
| 2001/0021933 A1 | 9/2001 | Kitamura | | |
| 2001/0047351 A1 * | 11/2001 | Abe | .............................. | 707/3 |
| 2003/0052907 A1 | 3/2003 | Rekimoto | | |
| 2003/0069893 A1 * | 4/2003 | Kanai et al. | .............. | 707/104.1 |
| 2005/0160107 A1 * | 7/2005 | Liang | ......................... | 707/100 |
| 2005/0222975 A1 * | 10/2005 | Nayak et al. | ................... | 707/3 |
| 2005/0289106 A1 * | 12/2005 | Petri et al. | ..................... | 707/1 |
| 2005/0289108 A1 * | 12/2005 | Carol et al. | .................... | 707/1 |

(Continued)

FOREIGN PATENT DOCUMENTS

JP 2000-207263 7/2000

(Continued)

*Primary Examiner*—Don Wong
*Assistant Examiner*—Thanh-Ha Dang
(74) *Attorney, Agent, or Firm*—Fujitsu Patent Center

(57) ABSTRACT

A computer-readable recording medium storing an information search program capable of retrieving desired information with ease. An index information-producing section produces index information associating a preparation object keyword with file identification information for identifying files in the file information each including, in a usage time zone thereof, a date and time matching a date and time at which the preparation object keyword was entered, based on dates and times at which the keyword in the keyword information stored in a keyword information-storing section was entered, and usage time zones during which files in the file information are used. A retrieval section retrieves the preparation object keyword matching a search object keyword entered by a keyword input operation from the index information, and outputs the file identification information for identifying files associated with the retrieved preparation object keyword.

9 Claims, 15 Drawing Sheets

U.S. PATENT DOCUMENTS

| | | | |
|---|---|---|---|
| 2005/0289109 A1* | 12/2005 | Arrouye et al. | 707/1 |
| 2006/0031220 A1* | 2/2006 | Newbold et al. | 707/7 |
| 2006/0031253 A1* | 2/2006 | Newbold et al. | 707/104.1 |
| 2006/0041521 A1* | 2/2006 | Oral et al. | 707/1 |
| 2006/0080343 A1* | 4/2006 | Carter et al. | 707/100 |
| 2006/0106793 A1* | 5/2006 | Liang | 707/5 |
| 2006/0195465 A1* | 8/2006 | Atchison et al. | 707/102 |
| 2007/0002363 A1* | 1/2007 | Komamura et al. | 358/1.15 |
| 2007/0033169 A1* | 2/2007 | Friedman | 707/3 |
| 2007/0094285 A1* | 4/2007 | Agichtein et al. | 707/101 |

FOREIGN PATENT DOCUMENTS

JP   2001-256087   9/2001

* cited by examiner

34a FILE INFORMATION TABLE

| FILE NAME | USAGE TIME ZONE |
|---|---|
| FILE a | 2006/1/23/8:50~9:21、2006/2/6/10:41~10:51 |
| FILE b | 2006/1/23/9:10~9:26 |
| FILE c | 2006/1/28/10:51~11:09 |

42a INDEX INFORMATION TABLE

| KEYWORD NAME (PREPARATION OBJECT KEYWORD) | USAGE TIME ZONE |
|---|---|
| COMPUTING MACHINE | FILE A(-0:18~0:19), FILE C(0:04~0:22) |
| NETWORK | FILE B(-0:08~0:08), FILE A(-0:28~0:03) |
| ... | ... |

COMPUTER-READABLE RECORDING MEDIUM STORING INFORMATION SEARCH PROGRAM, INFORMATION SEARCH METHOD, AND INFORMATION SEARCH SYSTEM

CROSS-REFERENCE TO RELATED APPLICATIONS

This application is based upon and claims the benefits of priority from the prior Japanese Patent Application No. 2006-097252, filed on Mar. 31, 2006, the entire contents of which are incorporated herein by reference.

BACKGROUND OF THE INVENTION

1. Field of the Invention

This invention relates to a computer-readable recording medium storing an information search program, an information search method, and an information search system, and more particularly to a computer-readable recording medium storing an information search program for searching for desired files, and an information search method and system for searching for desired files.

2. Description of the Related Art

With the recent increase in the capacity and service life of an HDD (hard disk drive) installed in a PC (Personal Computer), it has been possible to store a large amount of files in the PC. On the other hand, with the increase in the number of files stored in the PC, it has been difficult to orderly arrange and identify the files stored in the PC, which results in an increase in the cost of conducting a file search.

To eliminate this inconvenience, various file search methods have been proposed for searching for desired files. For example, search methods have been proposed in which associations between files and situations (contexts) in which the respective files are used are recorded, and in conducting a file search, desired files are searched for based on the recorded associations by making use of the contexts in which the desired files were used (see e.g. Japanese Laid-Open Patent Publication (Kokai) No. 2000-207263, and Japanese Laid-Open Patent Publication (Kokai) No. 2001-256087). More specifically, there have been proposed, for example, a search method based on a so-called directory type search, in which files are registered (stored) in folders on a category (field)-by-category (field) basis, and files are searched for using the name of each folder as a guide, and a search method using the event-recording function of a Web browser, in which time periods during which each file was used are set to contexts and the contexts are made use of to find a file.

However, the search method based on the directory type search suffers from the problem that the determination of an association between a context and a file is carried out by a registrant, and hence the operation for determining the association imposes a large burden on the registrant. Further, the registrant determines only during registration whether or not an association exists, and hence an association which becomes important afterwards cannot be considered. Moreover, when categories of files overlap each other, files are sometimes stored in different folders. This can eventually cause omission of files to be searched, which makes it impossible to necessarily search for and find desired files.

Further, in the method in which time periods during which each file was used are set to contexts, it is generally difficult for the user to remember dates and times at which files were used, and hence it is not easy to designate a context for designating desired files (usage times of the desired files).

SUMMARY OF THE INVENTION

The present invention has been made in view of these points, and an object thereof is to provide a computer-readable recording medium storing an information search program capable of searching for desired information with ease, and an information search method and system capable of searching for desired information with ease.

To attain the above object, in a first aspect of the present invention, there is provided a computer-readable recording medium storing an information search program for searching for desired files. This computer-readable recording medium is characterized by causing a computer to function as a keyword detecting section for detecting a keyword entered by a user, a keyword information-producing section for producing keyword information associating the keyword detected by the keyword detecting section with dates and times at which the keyword was entered, a keyword information-storing section for storing the keyword information produced by the keyword information-producing section, a file detecting section for monitoring a situation in which each file is used, and being operable when the file is opened to detect a date and time at which the file is opened and a date and time at which the file is closed, a file information-producing section for producing file information associating usage time zones of the dates and times during which the file was used and which were detected by the file detecting section with file identification information for identifying the file, a file information-storing section for storing the file information produced by the file information-producing section, an index information-producing section for producing index information associating a preparation object keyword with file identification information for identifying files in the file information each including, in the usage time zone thereof, a date and time matching a date and time at which the preparation object keyword was entered, based on the dates and times at which the keyword in the keyword information stored in the keyword information-storing section was entered, and the usage time zones in the file information stored in the file information-storing section, a retrieval section for retrieving the preparation object keyword matching a search object keyword entered by a keyword input operation from the index information, and outputting file identification information for identifying files associated with the retrieved preparation object keyword, and a display section for displaying the file identification information output from the retrieval section on a screen.

To attain the above object, in a second aspect of the present invention, there is provided an information search method for searching for desired files. This information search method is characterized by comprising the steps of detecting a keyword entered by a user, producing keyword information associating the detected keyword with dates and times at which the keyword was entered, storing the produced keyword information, monitoring a situation in which each file is used, and being operable when the file is opened to detect a date and time at which the file is opened and a date and time at which the file is closed, producing file information associating usage time zones of the detected dates and times during which the file was used with file identification information for identifying the file, storing the produced file information, producing index information associating a preparation object keyword with file identification information for identifying files in the file information each including, in the usage time zone thereof, a date and time matching a date and time at which the preparation object keyword was entered, based on the dates and times at which the keyword in the stored keyword information was entered, and the usage time zones in the stored file information, retrieving the preparation object keyword matching a search object keyword entered by a keyword input operation from the index information, and outputting file identification information for identifying files associated with the retrieved preparation object keyword, and displaying the output file identification information on a screen.

To attain the above object, in a third aspect of the present invention, there is provided an information search system for searching for desired files. This information search system is characterized by comprising a keyword detecting section for detecting a keyword entered by a user, a keyword information-producing section for producing keyword information associating the keyword detected by the keyword detecting section with dates and times at which the keyword was entered, a keyword information-storing section for storing the keyword information produced by the keyword information-producing section, a file detecting section for monitoring a situation in which each file is used, and being operable when the file is opened to detect a date and time at which the file is opened and a date and time at which the file is closed, a file information-producing section for producing file information associating usage time zones of the dates and times during which the file was used and which were detected by the file detecting section with file identification information for identifying the file, a file information-storing section for storing the file information produced by the file information-producing section, an index information-producing section for producing index information associating a preparation object keyword with file identification information for identifying files in the file information each including, in the usage time zone thereof, a date and time matching a date and time at which the preparation object keyword was entered, based on the dates and times at which the keyword in the keyword information stored in the keyword information-storing section was entered, and the usage time zones in the file information stored in the file information-storing section, a retrieval section for retrieving the preparation object keyword matching a search object keyword entered by a keyword input operation from the index information, and outputting file identification information for identifying files associated with the retrieved preparation object keyword, and a display section for displaying the file identification information output from the retrieval section on a screen.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a diagram showing an example of the data structure of file information.

FIG. 10 is a diagram showing an example of the data structure of index information.

DESCRIPTION OF THE PREFERRED EMBODIMENTS

The invention will now be described in detail with reference to the drawings showing a preferred embodiment thereof.

First, the concept of the invention applied to the embodiment will be described, and then a description will be given of details of the embodiment.

Figure 1:
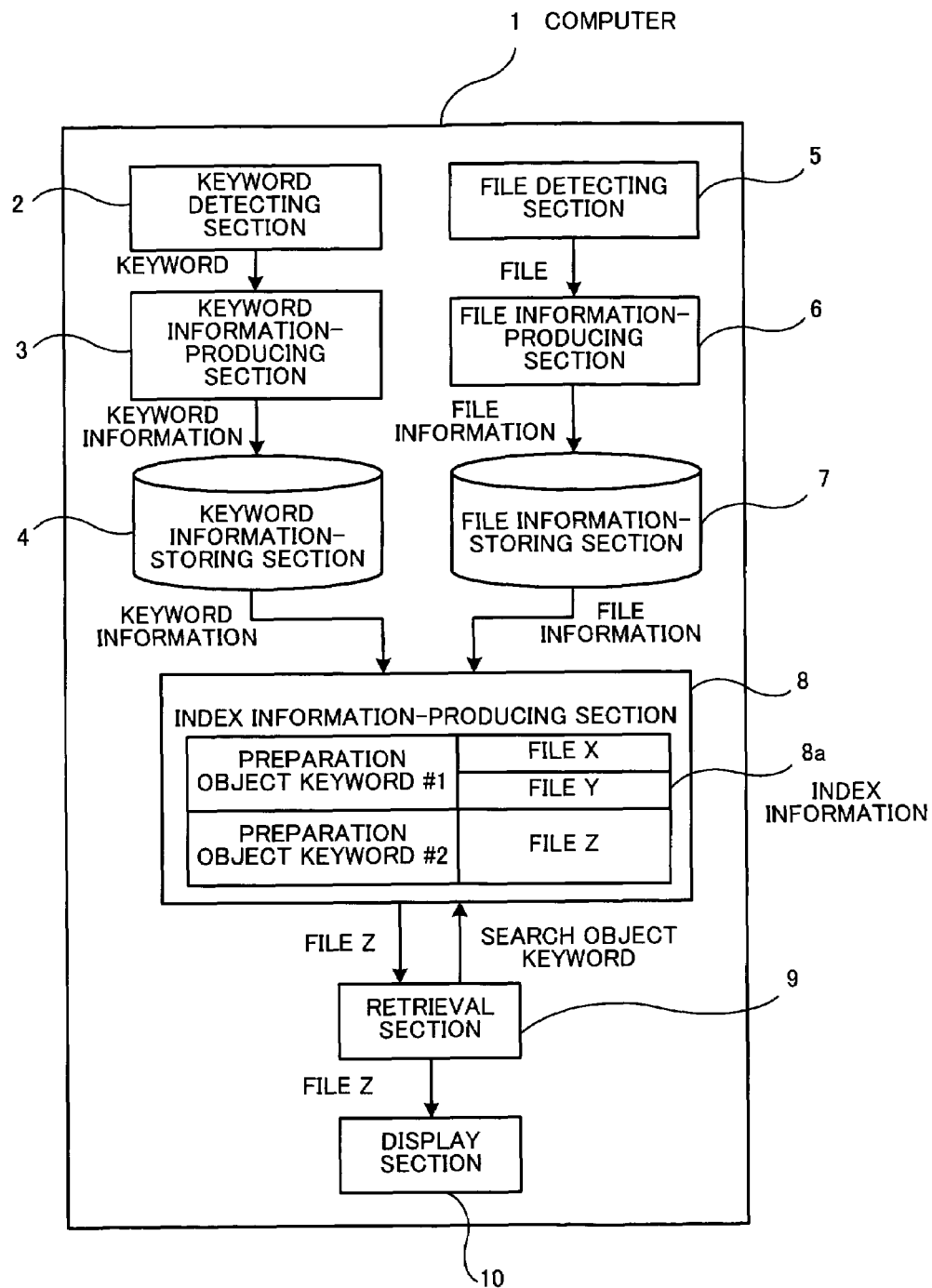
FIG. 1 is a schematic diagram of the concept of the present invention applied to the embodiment of the invention.

FIG. 1 is a schematic diagram of the concept of the present invention applied to the embodiment of the invention.

A computer 1 shown in FIG. 1 carries out an information search program for searching for desired files (information).

The information search program is capable of causing the computer 1 to function as a keyword detecting section 2, a keyword information-producing section 3, a keyword information-storing section 4, a file detecting section 5, a file information-producing section 6, a file information-storing section 7, an index information-producing section 8, a retrieval section 9, and a display section 10.

The keyword detecting section 2 detects a keyword entered by a user using a keyboard or the like.

The keyword information-producing section 3 produces keyword information associating the keyword detected by the keyword detecting section 2 with dates and times at which the keyword was entered.

The keyword information-storing section 4 stores the keyword information produced by the keyword information-producing section 3.

The file detecting section 5 monitors a situation in which each file is used. When the file is opened, the file detecting section 5 detects a date and time at which the file is opened and a date and time at which the file is closed.

The file information-producing section 6 produces file information which associates usage time zones defined by dates and times, during which the file was used and which were detected by the file detecting section 5, with information for identifying the file.

The file information-storing section 7 stores the file information produced by the file information-producing section 6.

The index information-producing section 8 produces index information 8a that associates a preparation object keyword with respective pieces of information for identifying files in respective pieces of file information each including, in a usage time zone thereof, a date and time matching a date and time at which the preparation object keyword was entered, based on the dates and times at which was entered the keyword in the keyword information stored in the keyword information-storing section 4, and the usage time zones defined by the dates and times, during which was used each file in the file information stored in the file information-storing section 7. In FIG. 1, a preparation object keyword #1 and a preparation object keyword #2 are produced as respective pieces of the index information 8a. File names "File X" and "File Y" are associated with the preparation object keyword #1. A File name "File Z" is associated with the preparation object keyword #2.

For example, when an operation for entering a keyword has been performed by the user, the retrieval section 9 retrieves a preparation object keyword matching the entered search object keyword from the index information 8a, and delivers information for identifying files associated with the retrieved preparation object keyword. FIG. 1 shows the case where the search object keyword and the preparation object keyword #2 match each other, and the file name "File Z" is output.

The display section 10 displays the information for identifying the files, delivered from the retrieval section 9, in a display screen.

According to the information search program described above, a keyword entered by the user is detected by the keyword detecting section 2. Keyword information associating the keyword detected by the keyword detecting section 2 with dates and times at which the keyword was entered is produced by the keyword information-producing section 3. The keyword information produced by the keyword information-producing section 3 is stored in the keyword information-storing section 4.

Further, the situation in which each file is used is monitored by the file detecting section 5. When the file is opened, the date and time at which the file is opened and the date and time at which the file is closed are detected by the file detecting section 5. File information which associates the usage time zones defined by the dates and times, during which the file was used and which were detected by the file detecting section 5, with information for identifying the file is produced by the file information-producing section 6.

The file information produced by the file information-producing section 6 is stored in the file information-storing section 7.

The index information 8a that associates a preparation object keyword with respective pieces of information for identifying files in respective pieces of file information each including, in a usage time zone thereof, a date and time matching the date and time at which the preparation object keyword was entered, is produced by the index information-producing section 8 based on the dates and times at which was entered the keyword in the keyword information stored in the keyword information-storing section 4, and the usage time zones defined by the dates and times, during which was used each file in the file information stored in the file information-storing section 7.

Further, a preparation object keyword matching the search object keyword entered through the operation for entering the keyword is retrieved from the index information 8a by the retrieval section 9, and information for identifying files associated with the retrieved preparation object keyword is output by the retrieval section 9. The information for identifying the files, output from the retrieval section 9, is displayed on the screen by the display section 10.

Hereinafter, a detailed description will be given of the embodiment of the invention.

Figure 2:
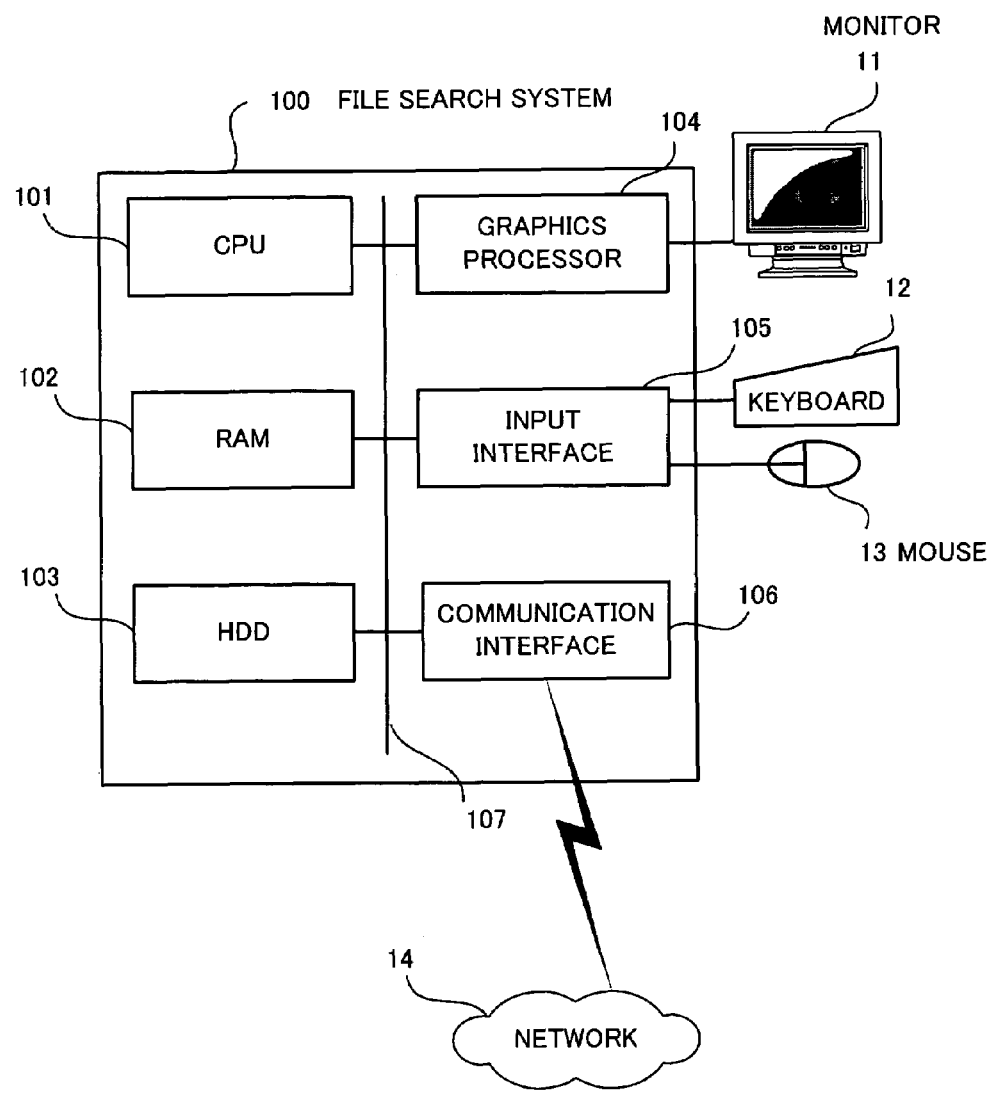
FIG. 2 is a diagram showing an example of the hardware configuration of a file search system.

FIG. 2 is a diagram showing an example of the hardware configuration of a file search system.

The overall operation of the file search system 100 is controlled by a CPU (Central Processing Unit) 101. A RAM (Random Access Memory) 102, a hard disk drive (HDD) 103, a graphics processor 104, an input interface 105, and a communication interface 106 are connected to the CPU 101 via a bus 107.

The RAM 102 temporarily stores at least part of the program of an OS (Operating System) and application programs executed by the CPU 101. Further, the RAM 102 stores various data required for processing by the CPU 101. The HDD 103 stores the OS and the application programs. Further, the HDD 103 stores program files.

The graphics processor 104 is connected to a monitor 11 to display an image on the screen of the monitor 11 in response to commands from the CPU 101. The input interface 105 has a keyboard 12 and a mouse 13 connected thereto, for sending signals received from the keyboard 12 and the mouse 13 to the CPU 101 via the bus 107.

The communication interface 106 can be connected to a network 14, and perform transmission and reception of data to and from other computers over the network 14.

The hardware configuration described above can implement the processing functions of the present embodiment. To perform file search by the file search system 100 having the above hardware configuration, the following functions are provided in the system 100.

Figure 3:
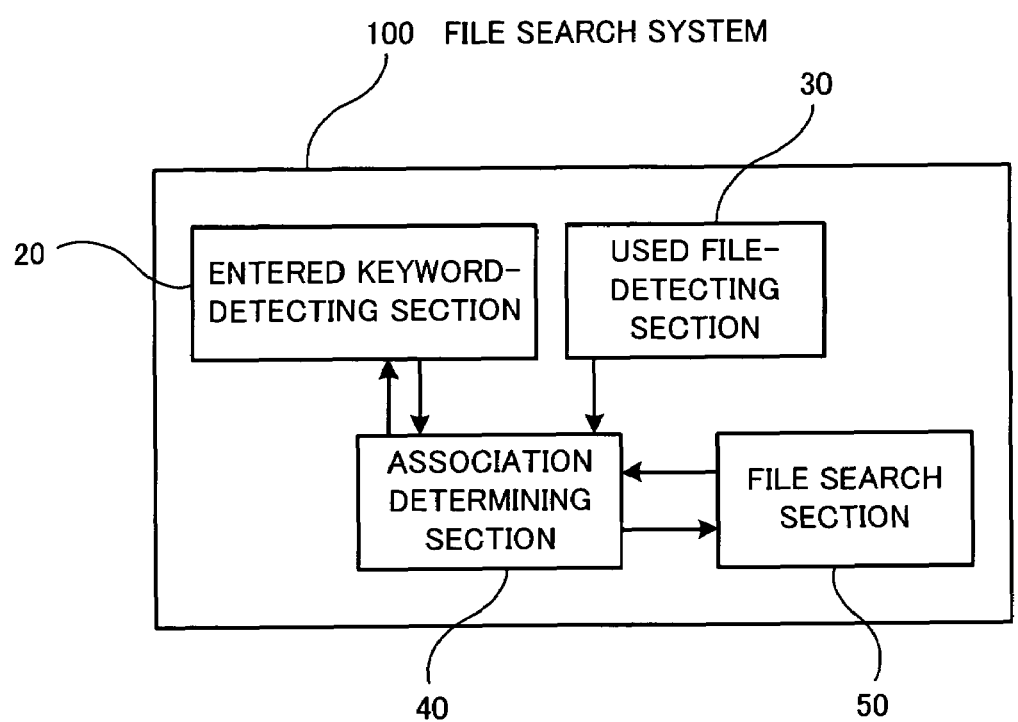
FIG. 3 is a functional block diagram of the file search system.

FIG. 3 is a functional block diagram of the file search system.

The file search system 100 is comprised of an entered keyword-detecting section 20, a used file-detecting section 30, an association determining section 40, and a file search section 50. The above sections function in parallel with each other (independently of each other).

Hereinafter, a detailed description will be given of the functions.

Figure 4:
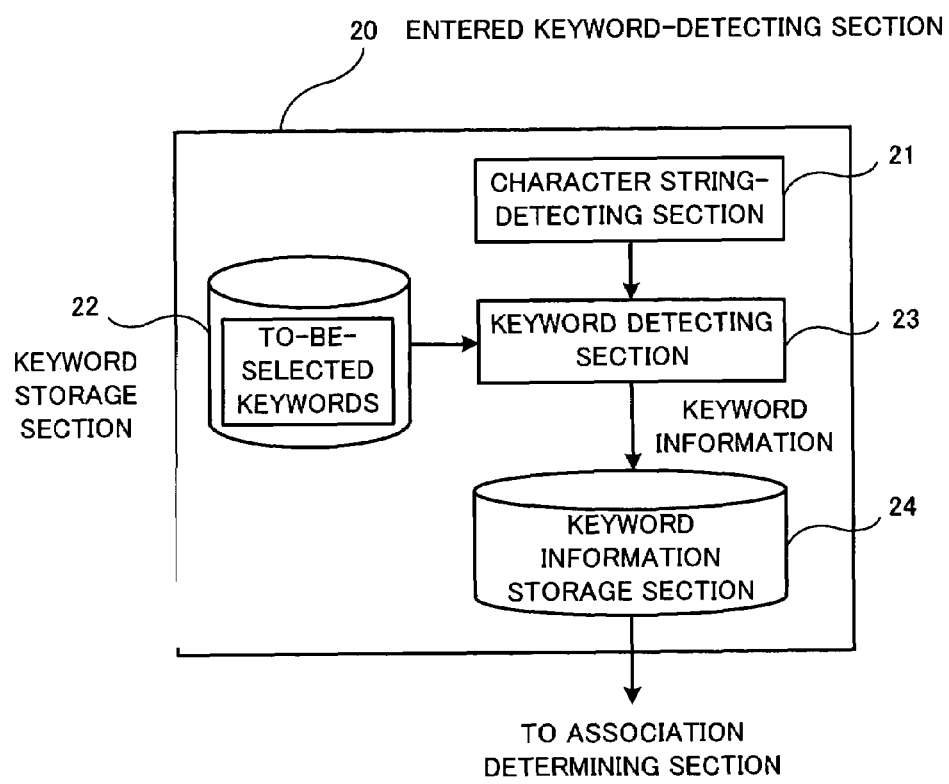
FIG. 4 is a block diagram showing an entered keyword-detecting section.

FIG. 4 is a block diagram showing the entered keyword-detecting section.

The entered keyword-detecting section 20 comprises a character string-detecting section 21, a keyword storage section 22, a keyword detecting section 23, and a keyword information storage section 24.

The character string-detecting section 21 monitors a character string conversion process by a kana-kanji conversion function provided for the file search system 100 in advance. When the character conversion has been finalized, the character string-detecting section 21 takes out a character string whose character conversion has been finalized, and delivers the character string together with the information of a conversion-determined date and time at which the character string was entered (hereinafter referred to as "time information"), to the keyword detecting section 23. Further, when it is judged that the user is performing an entry without using the kana-kanji conversion function (i.e. only using alphabetic letters, numerals, and symbols), the character string-detecting section 21 takes out each of words separated by spaces as a character string, and outputs the character string and time information on the entry of the character string, to the keyword detecting section 23.

The keyword storage section 22 stores to-be-selected keywords, as rules according to which the keyword detecting section 23 detects each keyword. The to-be-selected keywords include nouns and the like, although not particularly limited.

The keyword detecting section 23 extracts a character string matching any of the to-be-selected keywords stored in the keyword storage section 22, from the character string of which the character conversion has been finalized, as a keyword, and produces keyword information formed from the keyword and time information on the character string, followed by delivering the keyword information to the keyword information storage section 24.

The character string-detecting section 21 and the keyword detecting section 23 form essential parts of the keyword detecting section and the keyword information-producing section.

The keyword information storage section 24 stores the keyword information produced by the keyword detecting section 23.

The keyword information is stored in a tabular form in the keyword information storage section 24.

Figure 5:
FIG. 5 is a diagram showing an example of the data structure of keyword information.

FIG. 5 is a diagram showing an example of the data structure of the keyword information.

A keyword information table 24a includes the columns of "Keyword Name" and "Entry Date and Time", and pieces of information arranged in each row in the respective columns are associated with each other.

In the column of "Keyword Name", there are set keywords to be associated in the keyword information.

Time information, that is, the dates and times at which each keyword was entered are stored in the column of "Entry Date and Time". When the same keyword was entered a plurality of times, the respective dates and times at which the keyword was entered are stored.

Figure 6:
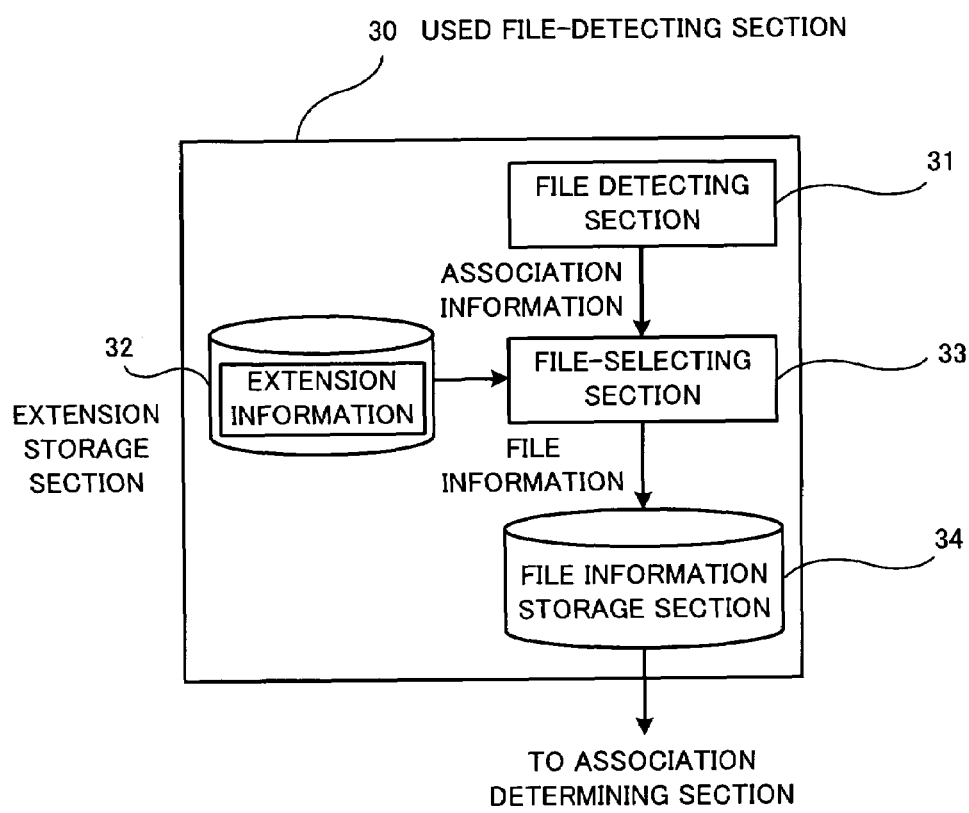
FIG. 6 is a block diagram showing a used file-detecting section.

FIG. 6 is a block diagram showing the used file-detecting section.

The used file-detecting section 30 comprises a file detecting section 31, an extension storage section 32, a file selecting section 33, and a file information storage section 34.

The file detecting section 31 monitors a situation in which each file is used by an OS (Operating System) or an application operating on the OS. When the user starts a file and works on the file displayed on the monitor 11 (when the user uses the file), the file detecting section 31 detects the file and a usage time zone defined by a date and time at which the file is opened and a date and time at which the file is closed.

Further, the file detecting section 31 detects not only the file worked on by the user but also files, such as a temporary work file and a settings file used by the application or the OS during the work, which the user has used unconsciously in the work process.

After the detections of the files described above, the file detecting section 31 produces association information associating the usage time zones during which the files were used with file names, and delivers the association information to the file selecting section 33.

The extension storage section 32 stores extension information (file selection rule information) indicative of extensions of files to be selected of a file group used in the work process. The extension information includes e.g. extensions (doc, ppt, and txt) designated by the user, and extensions of files having the possibility of being edited by the user intentionally.

The file selecting section 33 selects files having extensions included in the extension information from the association information produced by the file detecting section 31, and delivers association information having entries of the selected files to the file information storage section 34 as file information.

The file detecting section 31 and the file selecting section 33 form essential parts of the file detecting section and the file information-producing section.

The file information storage section 34 stores the file information output from the file selecting section 33.

The file information storage section 34 stores the file information in a tabular form.

FIG. 7 is a diagram showing an example of the data structure of the file information.

A file information table 34a includes the columns of "File Name" and "Usage Time Zone", and pieces of information arranged in each row in the respective columns are associated with each other.

In the column of "File Name", there are set names for uniquely identifying respective files.

In the column of "Usage Time Zone", a date and time at which each file was opened and a date and time at which the file was closed are stored as dates and times defining a usage time zone. When the same file is opened a plurality of times, the usage time zones of the respective times are stored.

Figure 8:
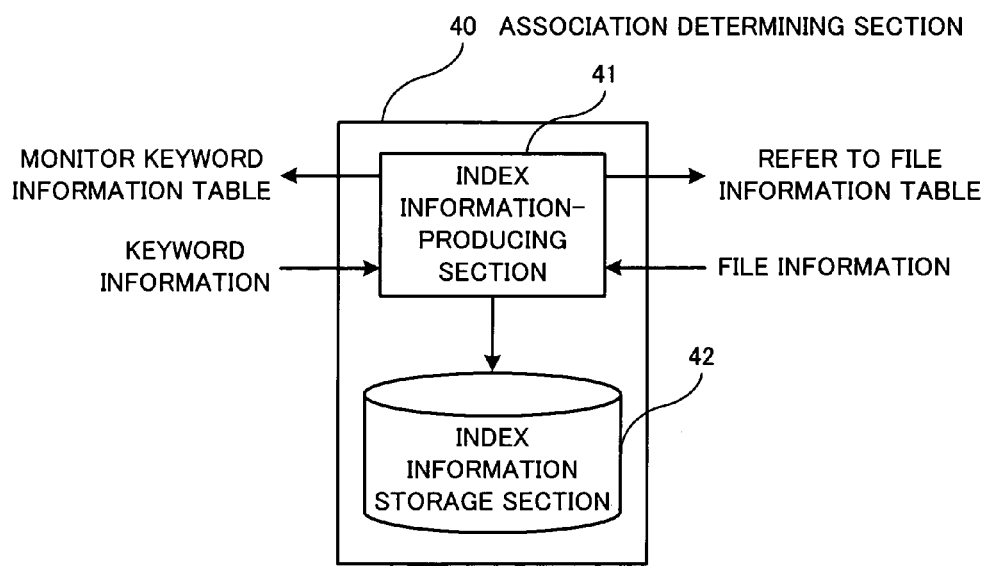
FIG. 8 is a block diagram showing an association determining section.

FIG. 8 is a block diagram showing the association determining section.

The association determining section 40 comprises an index information-producing section 41 and an index information storage section 42.

The index information-producing section 41 takes out a piece of keyword information stored in the keyword information table 24a, and looks up the file information table 34a, to take out file information which includes, in a usage time zone thereof, at least part of a total time period having a predetermined width (time width) T from a predetermined time point before a time (date and time) t contained in the taken-out piece of keyword information to a predetermined time point after the predetermined time point. It should be noted that the time width T can be set e.g. by the user as desired.

It should be noted that hereinafter, the keyword in keyword information taken out by the index information-producing section 41 will be referred to as "the preparation object keyword".

Although timing in which the index information-producing section 41 takes out keyword information is not particularly limited, in the present embodiment, the index information-producing section 41 monitors the keyword information table 24a, and takes out keyword information whenever the table 24a is updated.

Next, a description will be given of file information taken out when keywords "computer" and "network" shown in FIG. 5 are taken out as preparation object keywords, assuming that the keyword information storage section 24 stores keyword information shown in the keyword information table 24a shown in FIG. 5, and the file information storage section 34 stores the file information table 34a shown in FIG. 7.

Figure 9:
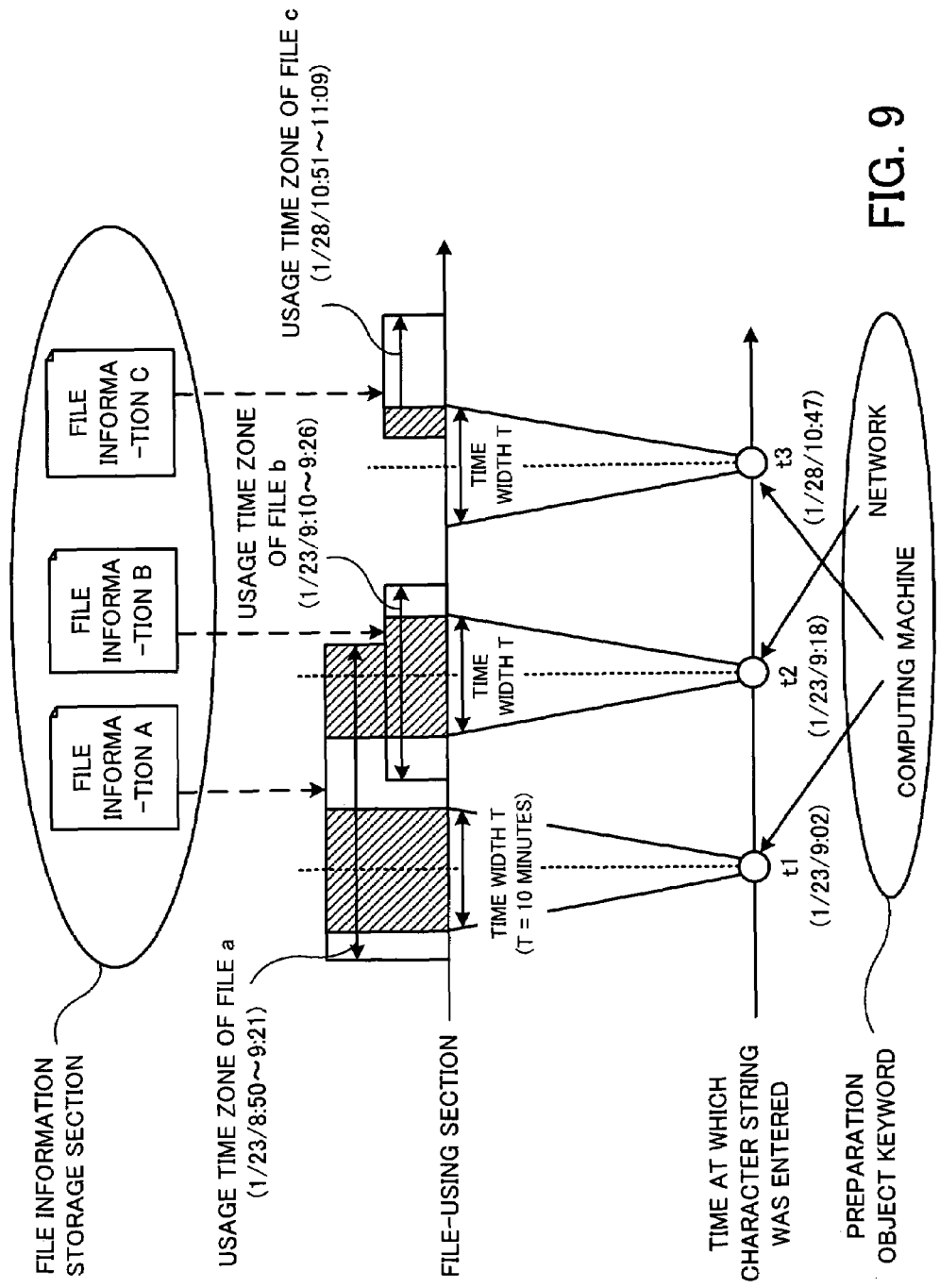
FIG. 9 is a diagram showing the relationship between preparation object keywords and files.

FIG. 9 is a diagram showing the relationship between the preparation object keywords and files.

In the present embodiment, a case is shown in which the time width T is set to ten minutes. More specifically, five minutes before and after a time t1, a time t2, and a time t3 is set to the time width T. Further, in FIG. 9, file information on a file "a" is defined as file information A, file information on a file "b" as file information B, and file information on a file "c" as file information C.

As shown in FIG. 9, the usage time zone (2006/1/23/8:50 to 9:21) of the file "a" overlaps the time t1 (2006/1/23/9:02) at which the preparation object keyword "computer" was entered. It should be noted that FIG. 9 shows overlapped portions each within the time width T by hatching. More specifically, it is understood that the file "a" was used in a time zone including a time point matching the time t1 at which the keyword "computer" was entered.

Further, the usage time zone of the file "a" and the usage time zone (2006/1/23/9:10 to 9:26) of the file "b" overlap the time t2 (2006/1/23/9:18) at which the preparation object keyword "network" was entered. More specifically, the file "a" and the file "b" were used in respective time zones including a time point matching the time t2 at which the keyword "network" was entered.

Further, part of the usage time zone (2006/1/28/10:51 to 11:09) of the file "c" overlaps the time width with respect to the time t3 (2006/1/28/10:47) at which the keyword "computer" was entered. That is, although the usage time zone of the file "c" does not include the time point matching the time t1 at which the keyword "computer" was entered, the file "c" started to be used at a time point before the lapse of five minutes after the time t3 at which the keyword "computer" was entered.

Based on the above-described information, the index information-producing section 41 takes out the file information A and the file information C as file information to be associated with the preparation object keyword "computer", and takes out the file information A and the file information B as file information to be associated with the preparation object keyword "network". Then, the index information-producing section 41 calculates a relative time period with respect to the time t1 at which the keyword "computer" was entered, included in the usage time zone of the file information A, produces index information associating the file name having the information of the relative time period added thereto with the keyword "computer", and stores the index information in the index information storage section 42.

Similarly, the index information-producing section 41 calculates a relative time period with respect to the time t2 at which the keyword "network" was entered, included in the usage time zone of the file information A, produces index information associating the file name having the information of the relative time period added thereto with the keyword "network", and stores the index information in the index information storage section 42. Further, the index information-producing section 41 calculates a relative time period with respect to the time t2 at which the keyword "network" was entered, included in the usage time zone of the file information B, produces index information associating a file name having the information of the relative time period added thereto with the keyword "network", and stores the index information in the index information storage section 42. Furthermore, the index information-producing section 41 calculates a relative time period with respect to the time t3 at which the keyword "computer" was entered, included in the usage time zone of the file information C, produces index information associating a file name having the information of the relative time period added thereto with the keyword "computer", and stores the index information in the index information storage section 42.

Thus, index information is produced which associates a preparation object keyword with respective pieces of information for identifying files in respective pieces of file information each including, in a usage time zone thereof, a time point matching a time (date and time) t included in keyword information corresponding to the preparation object keyword, and files in respective pieces of file information each including, in a usage time zone thereof, part of a total time period having the width (time width) T from a predetermined time period before the time t and a predetermined time period after the time t.

The index information-producing section 41 stores the produced index information in the index information storage section 42.

The index information storage section 42 stores the index information in a tabular form.

FIG. 10 is a diagram showing an example of the data structure of the index information.

An index information table 42a includes the columns of "Keyword Name" and "Usage Time Zone", and pieces of information arranged in each row in the respective columns are associated with each other.

In the column of "Keyword Name", there are stored preparation object keywords obtained by the index information-producing section 41.

In the column of "Usage Time Zone", usage time zone information is stored. When there are a plurality of pieces of usage time zone information, they are stored, respectively.

In FIG. 9, the file "a" was used, for example, from 18 minutes before a time point at which the keyword "computer" was entered until 19 minutes after the time point.

Figure 11:
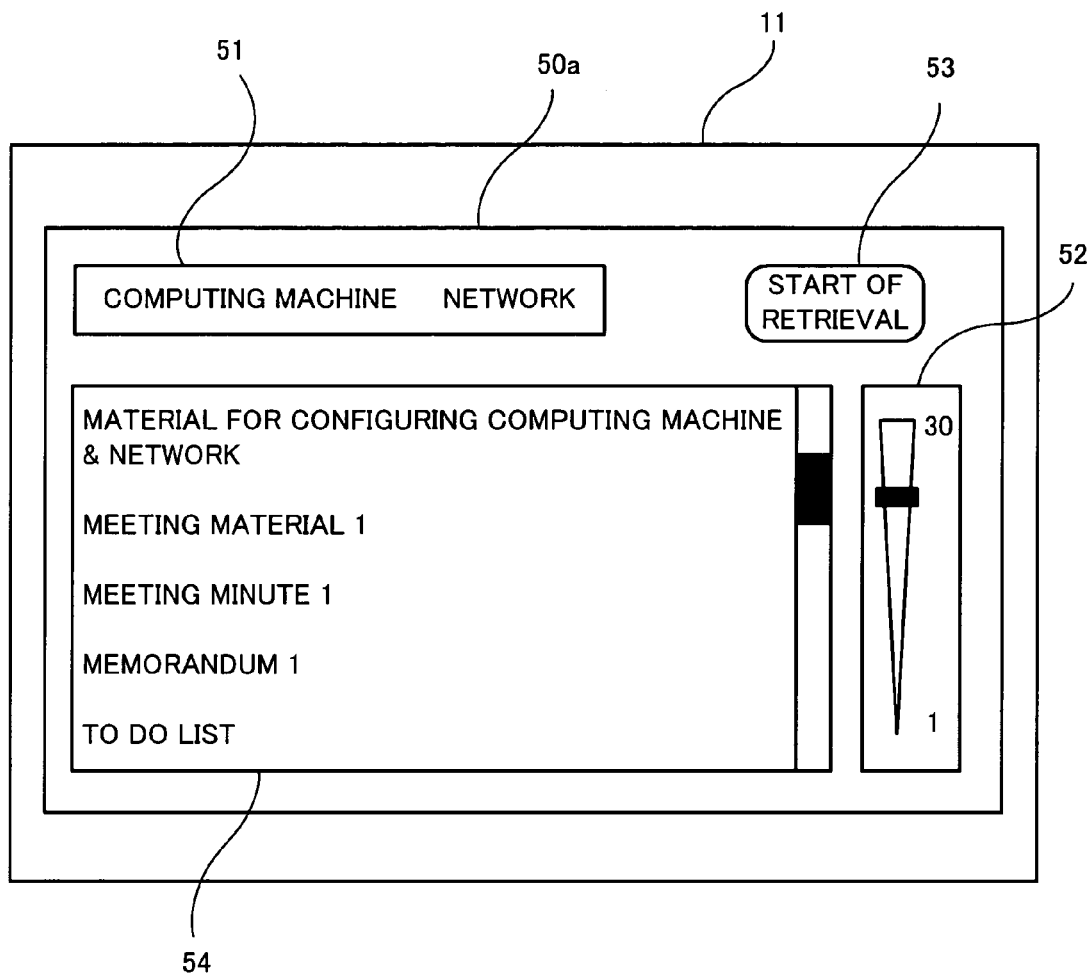
FIG. 11 is a diagram showing a search screen displayed on a monitor.

The file search section 50 has a GUI (Graphical User Interface) for displaying a search screen on the monitor FIG. 11 is a diagram showing the search screen displayed on the monitor 11.

The search screen 50a displays a search keyword-entering section 51, a time width-designating section 52, a search start button 53, and a result display section 54.

A keyword as a search object (hereinafter referred to as a "search object keyword") can be entered into the search keyword-entering section 51. It is possible to designate a plurality of search object keywords by separating using spaces.

The time width-designating section 52 is provided for designating an arbitrary time width T1 with respect to a time point at which a keyword matching the search object keyword was entered. By designating the time width T1, the file search section 50 outputs file names which are associated in the index information with the keyword matching the search object keyword and having a relative time period added thereto at least part of which is included within the time width T1, as a search result. The time width T1 can be designated by the user operating the time width-designating section 52. In FIG. 11, it is possible to designate a desired time period ranging from one minute to thirty minutes before and after the time point the keyword was entered, by way of example. It should be noted that the time width T1 is set to a value smaller than the time width T.

To start the search, the user presses the search start button 53.

When the search start button 53 is pressed, the file search section 50 performs a search operation and delivers file names as a result of execution of the search (search result). The search operation will be described in detail hereinafter.

The file name delivered by the file search section 50 is displayed on the result display section 54.

Next, a detailed description will be given of the operations of the respective sections of the file search system 100.

First of all, a description will be given of the operation of the entered keyword-detecting section 20.

Figure 12:
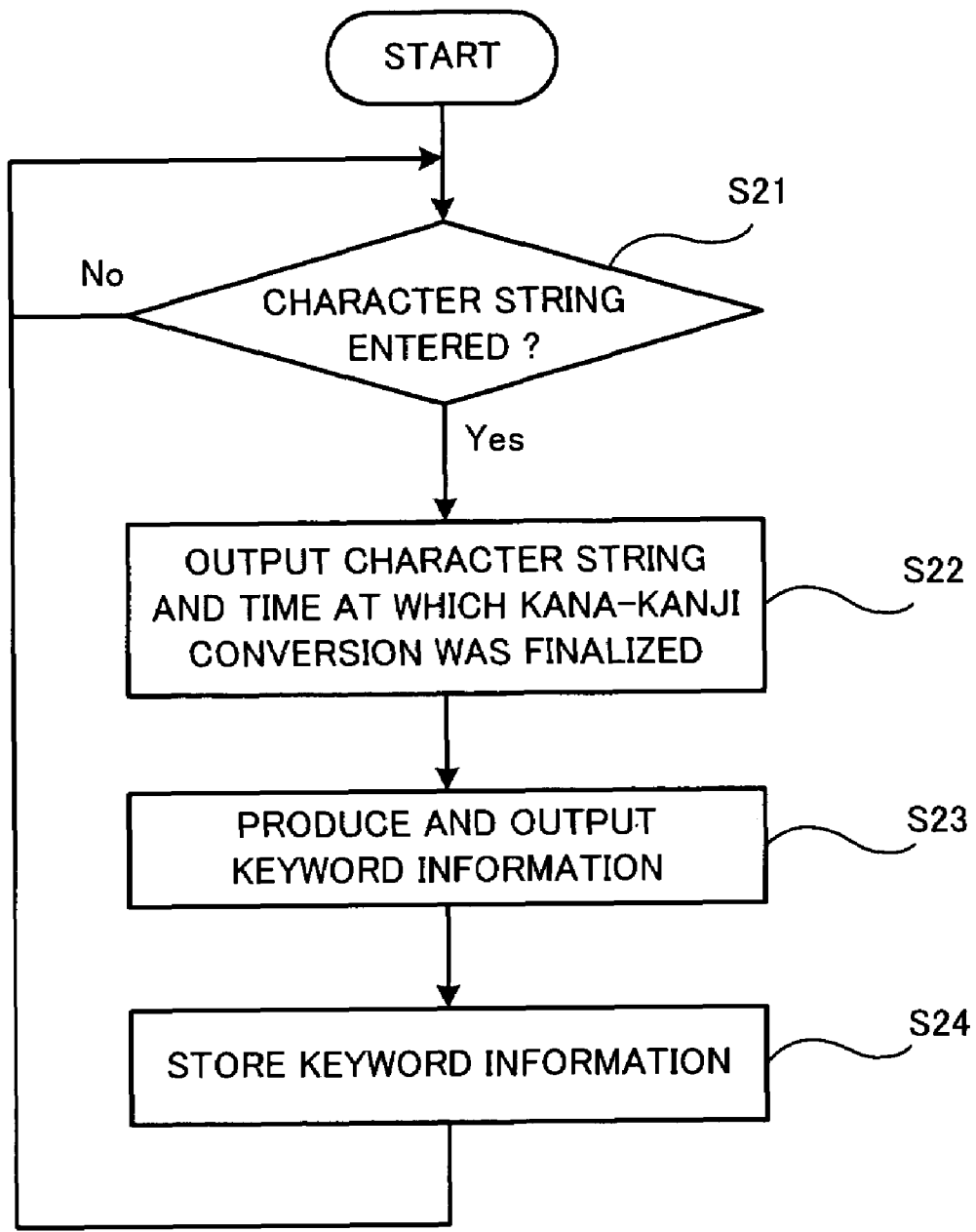
FIG. 12 is a flowchart showing the detecting operation of the entered keyword-detecting section.

FIG. 12 is a flowchart showing the detecting operation of the entered keyword-detecting section.

First, the character string-detecting section 21 determines whether or not any character string has been newly entered by the user (step S21). If no character string has been newly entered (No to S21), the character string-detecting section 21 awaits entry of a character string.

If any character string has been newly entered (Yes to S21), the character string-detecting section 21 outputs the character string and the information of a conversion determination time point at which character conversion has been finalized to enter the character string, to the keyword detecting section 23 (step S22).

The keyword detecting section 23 extracts a portion matching any of the to-be-selected keywords stored in the keyword storage section 22, from the entered character string, as a keyword, produces keyword information from the extracted keyword and the information of the conversion determination time point, and delivers the produced keyword information to the keyword information storage section 24 (step S23). The keyword information storage section 24 stores the keyword information (step S24). After that, the process returns to the step 21, wherein the detecting operation is continued.

Next, a description will be given of the detecting operation of the used file-detecting section 30.

Figure 13:
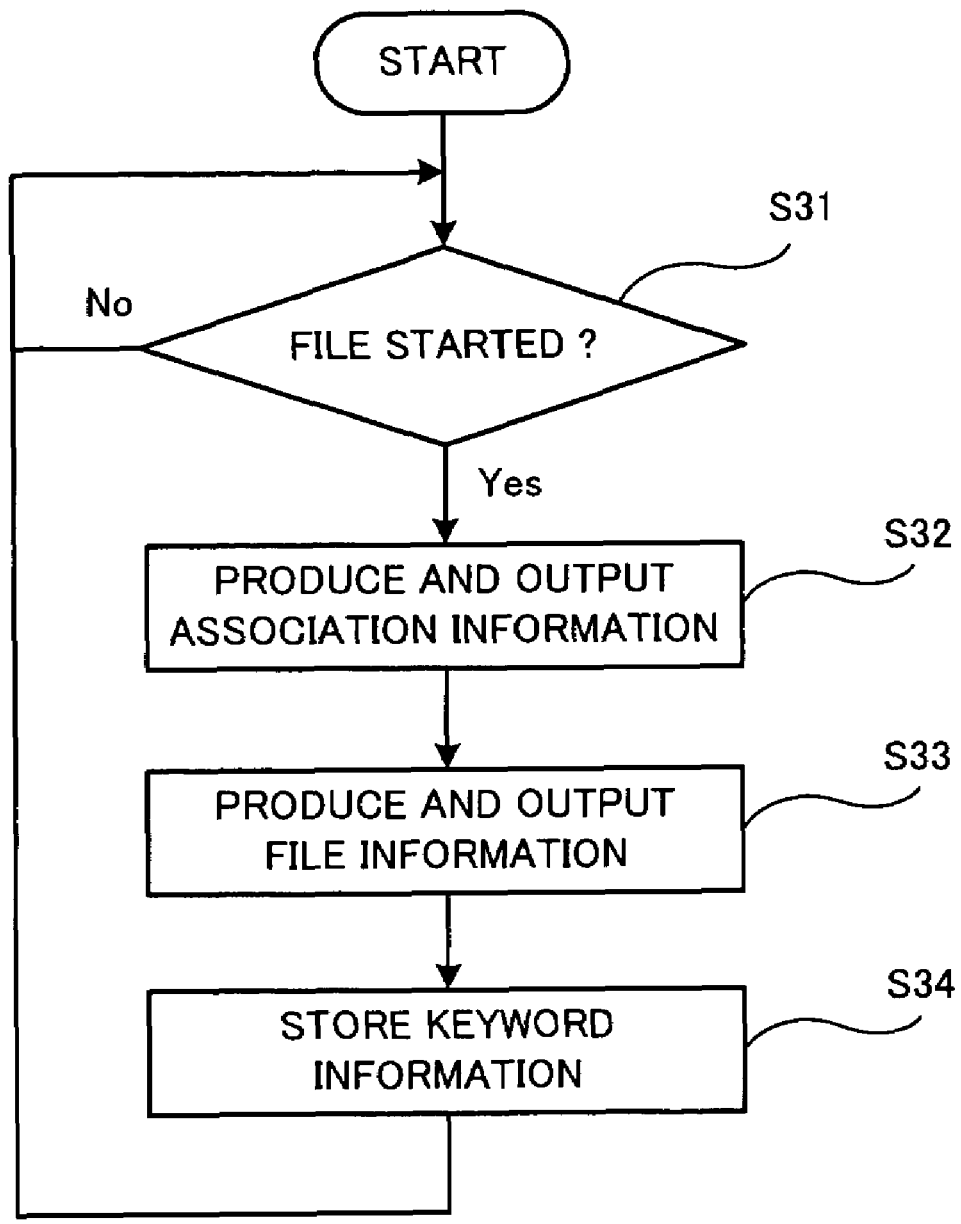
FIG. 13 is a flowchart showing the detecting operation of the used file-detecting section.

FIG. 13 is a flowchart showing the detecting operation of the used file-detecting section.

First, the file detecting section 31 determines whether or not any file has been newly started (step S31). If no file has been started (No to S31), the file detecting section 31 awaits a new start of a file.

If any file has been newly started (Yes to S31), the file detecting section 31 produces association information, and delivers the same to the file selecting section 33 (step S32).

Then, the file selecting section 33 produces file information, and delivers the same to the file information storage section 34 (step S33). The file information storage section 34 stores the file information (step S34). After that, the process returns to the step S31, wherein the detecting operation is continued.

Next, a description will be given of the operation of the association determining section 40.

Figure 14:
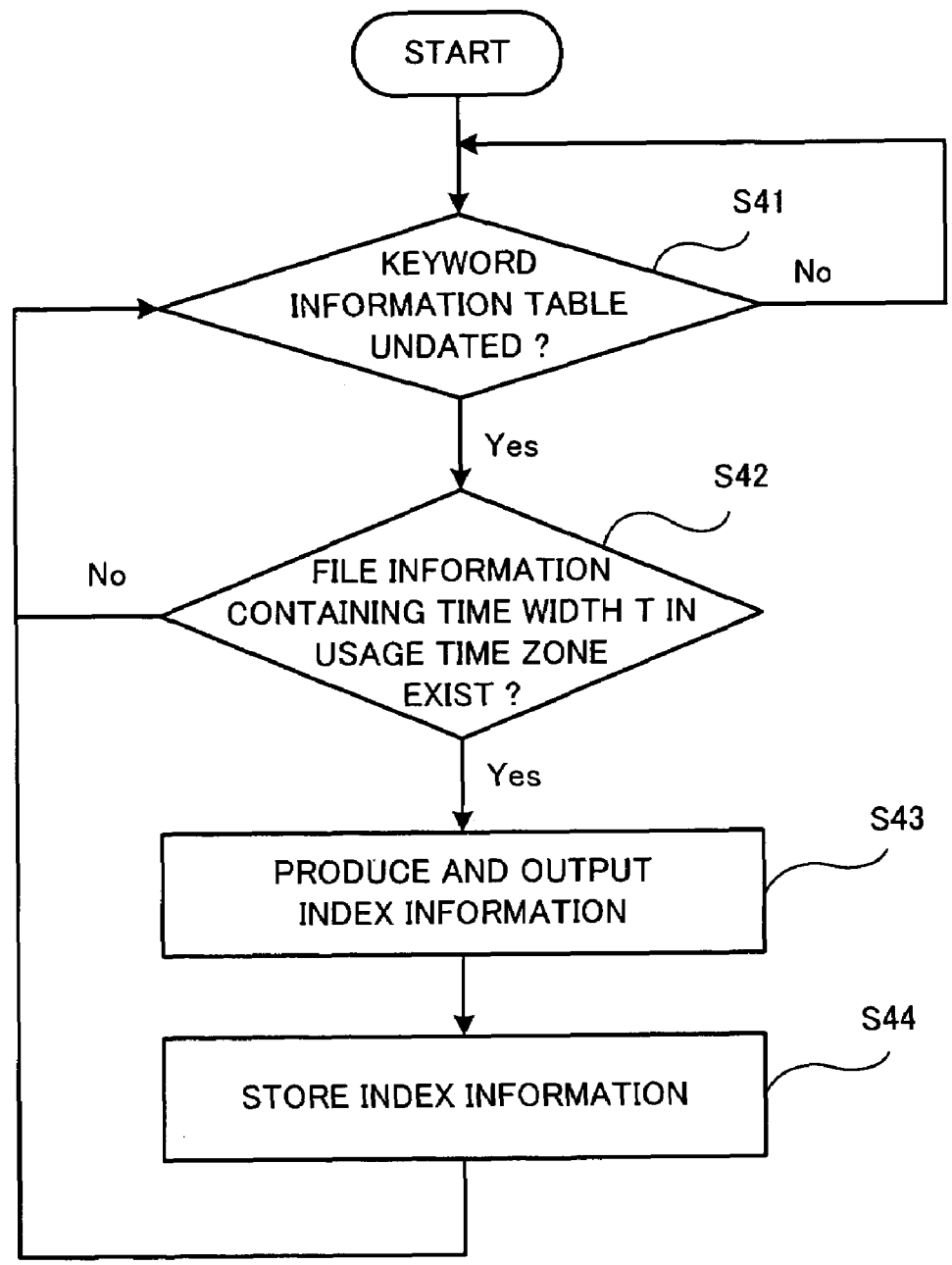
FIG. 14 is a flowchart showing the operation of an association determining section.

FIG. 14 is a flowchart showing the operation of the association determining section.

First, the index information-producing section 41 monitors the keyword information table 24a, and determines whether or not the keyword information table 24a has been updated (step S41).

If the keyword information table 24a has not been updated (No to S41), the index information-producing section 41 awaits update of the table 24a. On the other hand, if the keyword information table 24a has been updated (Yes to S41), the index information-producing section 41 determines whether or not there exists any new piece of file information that includes, in a usage time zone thereof, at least part of the time width T with respect to a time t included in keyword information of the preparation object keyword (step S42). If there exists no file information satisfying the condition of the step S42 (No to S42), the process proceeds to a step S41, whereas if there exists file information satisfying the condition of the step S42 (Yes to S42), the index information-producing section 41 takes out the file information, produces index information associating the file name in the file information with the preparation object keyword, and delivers the produced index information to the index information storage section 42 (step S43). The index information storage section 42 stores the index information (step S44). After that, the process proceeds to the step S41, wherein the determining operation is continued.

Next, a description will be given of the search operation of the file search section 50.

Figure 15:
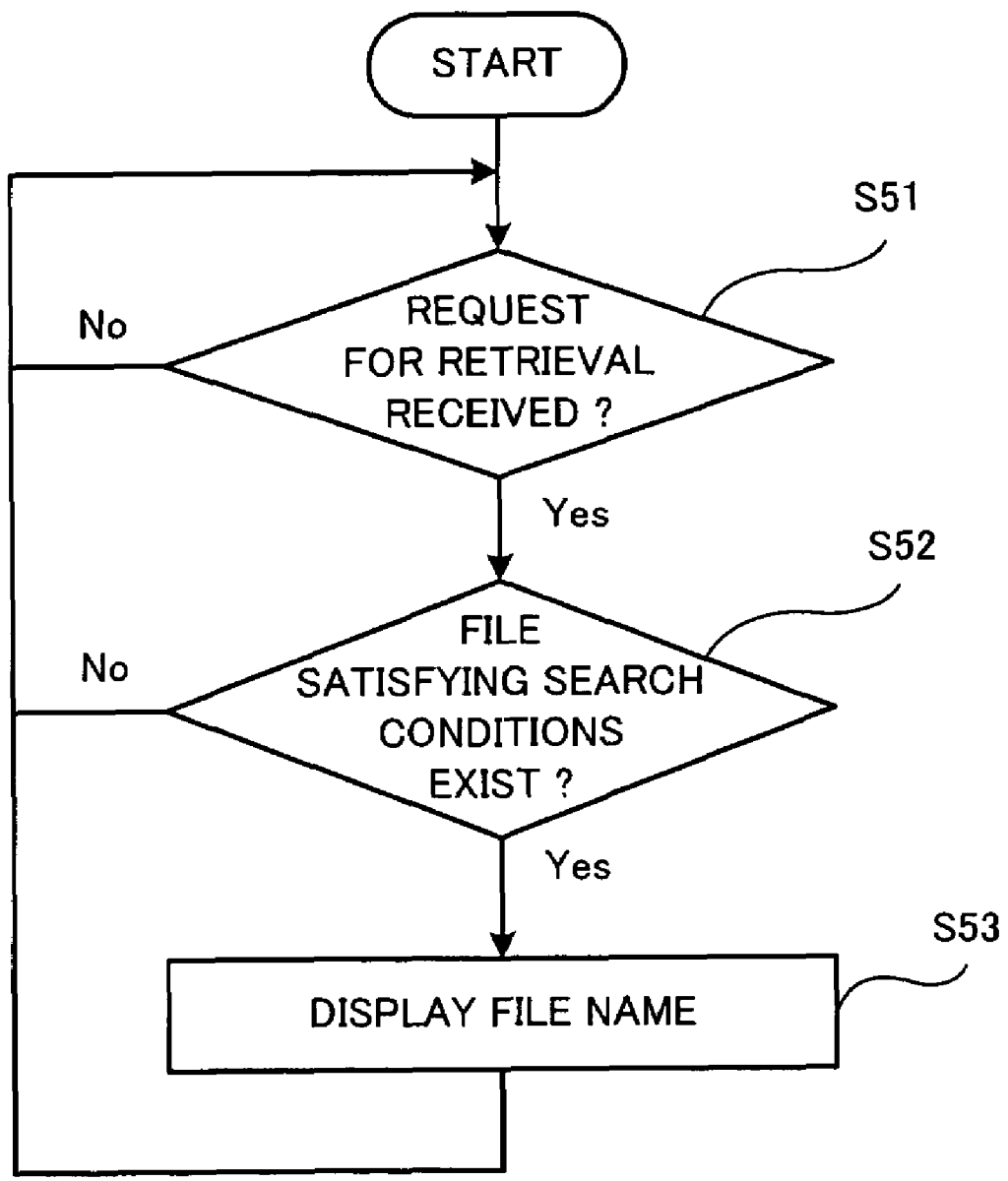
FIG. 15 is a flowchart showing the search operation of a file search section.

FIG. 15 is a flowchart showing the search operation of the file search section.

First, the file search section 50 determines whether or not the search start button 53 has been pressed (step S51). If the search start button 53 has not been pressed (No to S51), the file search section 50 awaits pressing of the search start button 53. On the other hand, if the search start button 53 has been pressed (Yes to S51), the file search section 50 searches for files satisfying conditions (search conditions) of the search object keyword entered in the search keyword-entering section 51 and the time width T1 designated by the time width-designating section 52 (step S52), with reference to the index information table 42a stored in the index information storage section 42. More specifically, the file search section 50 searches for file names which are associated in the index information with the keyword matching the search object keyword and having a relative time period added thereto at least part of which is included within the time width T1. If there exists no file satisfying the search conditions (No to S52), the process proceeds to the step S51 to continue the operation. On the other hand, if there exist files satisfying the search conditions (Yes to S52), the file search section 50 displays the file names of the files on the result display section 54 (step S53). Then, the process proceeds to the step S51 to continue the operation.

As described above, the file search system 100 of the present embodiment is configured such that the index information-producing section 41 produces index information which associates a keyword with file names of respective pieces of file information including, in respective usage time zones thereof, a time point matching a time (date and time) t at which the keyword was entered, from the file information and the keyword information, and the file search section 50 searches for files based on the index information. Therefore, when the user enters a keyword to the search keyword-entering section 51 and presses the search start button 53, files that the user was using at the time point at which the user entered the keyword, i.e. not only a file which the user was actually using for work but also e.g. files which the user had started for reference in producing the file are simultaneously searched for. This makes it possible to search for and find desired files easily and positively without the user arranging files orderly within the file search system 100 on a usage time-by-usage time basis or on a use purpose-by-use purpose basis.

Further, the index information-producing section 41 is configured such that it produces index information which associates a keyword with files in respective pieces of file information each including a usage time zone partially overlapping the time width T with respect to the time t at which the keyword was entered, so that when the user presses the search start button 53 after entering a keyword in the search keyword-entering section 51 and designating a time width T1 by the time width-designating section 52, there are searched for files in respective pieces of file information each including, in a usage time zone thereof, at least part of the time width T1 with respect to the time t at which the keyword was entered. This makes it possible to search for and find files which slightly deviate in usage time from a time point at which the keyword was entered, so that it is possible to find files without any omission, thereby making it possible to search for and find desired files more easily and positively.

Further, since the user can set the time width T1 under predetermined conditions as desired, the user can adjust file-searching accuracy with ease.

Further, since the file selecting section 33 sets files on which respective pieces of extension information indicative of extensions thereof are stored in the extension storage section 32, that is, only files having the possibility of being actually used by the user, to files to be searched for, it is possible to enhance the accuracy (search accuracy) of files which are to be shown in a file search result.

Further, the entered keyword-detecting section 20 and the used file-detecting section 30 are configured such that they produce keyword information and file information as context information, respectively, and store the produced keyword information in the keyword information storage section and the produced file information in the file information storage section, respectively, so that it is possible to eliminate load that would be placed on the user if he/she manually produces the keyword information and the file information. This makes it possible to easily produce keyword information and file information without omission of any piece of index information.

Further, since a keyword as an object detected by the character string-detecting section 21 is a character string which was entered by the user in the past, the keyword is easy to remember, thereby making it possible to perform a file search with higher accuracy than in the case where another kind of character string is used as the search object keyword.

Further, since keyword information is produced from character strings which were entered by the user in the past, keyword information on character strings which the user entered once but deleted thereafter is also produced. With this configuration, character strings which were entered in a file during elaboration but did not eventually remain in the file also set files which were being used at and around a time point of the entry to files to be searched for (enable the files to be searched for), so that it is possible to search for files which would not be displayed as a search result e.g. by the content-based search method. Therefore, for example, even if the user enters a keyword in a file in use, and then intentionally deletes the keyword, it is possible to produce annotations that do not remain in the file i.e. have been deleted therefrom afterwards, in desired timing. This makes it possible to organize files by a user's own method.

Furthermore, since the file search system 100 is capable of searching for files without exchanging files with another computer and the like, it is possible to prevent files as personal information from leaking from the system.

It should be noted that although in the present embodiment, the character string-detecting section 21 detects a character string using the kana-kanji conversion function, this is not limitative, but the character string-detecting section 21 may detect a keyword by performing morpheme analysis of a character string entered by key input by the user.

Further, although in the present embodiment, the file search section 50 is configured to search for files by taking out information stored in the index information storage section 42, this is not limitative, but the index information-producing section 41 of the association determining section 40 may be configured to await a request for a search from the file search section 50, and produce index information when it receives the request for a search.

Further, although in the present embodiment, the description has been given of the case in which the file search system is applied to a PC (personal computer), this is not limitative, but the file search system can be applied to a computing machine, such as a PDA (Personal Digital Assistants), for personal use.

It should be noted that the processing functions described above can be realized by a computer (by causing a computer to execute a predetermined file search program) To this end, there is provided a program describing the details of processing of the functions which the file search system 100 should have. By executing the program on the computer, the processing functions described above are realized on the computer. The program describing the details of processing can be recorded in a computer-readable recording medium. The computer-readable recording medium includes a magnetic recording device, an optical disk, a magneto-optical recording medium, and a semiconductor memory, for example. The magnetic recording device includes a hard disk drive (HDD), a flexible disk (FD), and a magnetic tape, for example. The optical disk includes a DVD (Digital Versatile Disk), a DVD-RAM (Random Access Memory), a CD-ROM (Compact Disk Read Only Memory), and a CD-R (Recordable)/RW (ReWritable), for example. Further, the magneto-optical recording medium includes an MO (Magneto-Optical disk), for example.

To make the program available on the market, portable recording media, such as DVD and CD-ROM, which store the program, are sold. Further, the program can be stored in a storage device of a server computer connected to a network, and transferred from the server computer to another computer via the network.

When the file search program is executed by a computer, the program stored e.g. in a portable recording medium or transferred from the server computer is stored in a storage device of the computer. Then, the computer reads the program from the storage device of its own and executes processing based on the program. The computer can also read the program directly from the portable recording medium and execute processing based on the program. Further, the computer may also execute processing based on a program which is transferred from the server computer whenever the processing is to be carried out.

In the present invention, the index information-producing section is configured to produce, based on dates and times at which keywords in keyword information stored in a keyword information-storing section were entered and usage time zones defined by dates and times during which files in file information stored in a file information-storing section were used, index information which associates a preparation object keyword with respective pieces of file identification information in respective pieces of file information each including a date and time matching a date and time at which the preparation object keyword was entered. Therefore, by using the keyword, it is possible to search for and find files which were being used when the keyword was entered, easily and positively.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium storing an information searching program to search for desired files, which when a computer executes the information searching program, the computer is caused to operate as:
    a keyword detecting unit to detect a keyword entered by a user;
    a keyword information-producing unit to produce keyword information associating the keyword detected by said keyword detecting unit with an entered date and time at which the keyword was entered;
    a keyword information-storing unit to store the keyword information produced by said keyword information-producing unit;
    a file detecting unit to monitor a situation in which a file is used, and when the file is opened, to detect an opened date and time at which the file is opened and a closed date and time at which the file is closed;
    a file information-producing unit to produce file information associating a usage time zone between the opened date and time and the closed date and time detected by said file detecting unit, during which the file was used, with file identification information identifying the file;
    a file information-storing unit to store the file information produced by said file information-producing unit;

an index information-producing unit to produce index information associating the keyword as a preparation object keyword with the file identification information of the file information having the usage time zone within which the entered date and time falls, based on the entered date and time included in the keyword information stored in said keyword information-storing unit, and the usage time zone included in the file information stored in said the information-storing unit;

a retrieval unit to retrieve the preparation object keyword matching a search object keyword entered by a keyword input operation from the index information-producing unit, and to output the file identification information associated with the retrieved preparation object keyword; and a display unit to display the file identification information output from said retrieval unit on a screen, wherein:

said index information-producing unit produces the index information by adding information of relative time periods with respect to the date and time at which the keyword was entered to the file identification information, and said retrieval unit includes a time width-designating unit to designate a predetermined time width with respect to the date and time at which the keyword was entered by a time width-selecting operation, and wherein when the search object keyword is entered, and the predetermined time width is designated by said time width-designating unit, said retrieval unit refers to the information of relative time periods added to the file identification information of files associated with the preparation object keyword matching the entered search object keyword, and output the file identification information of files in each of which at least part of the relative time period is included within the predetermined time width, as a search result.

2. The computer-readable recording medium according to claim 1, wherein said keyword detecting unit detects the keyword from an input character string.

3. The computer-readable recording medium according to claim 1, wherein said file detecting unit monitors a situation in which the file displayed on the screen is used.

4. The computer-readable recording medium according to claim 1, wherein said file information-producing unit includes a file-selecting unit to select files having specified extensions from files detected by the file detecting unit, and wherein said file information-producing unit produces the file information based on the files selected by said file-selecting unit.

5. The computer-readable recording medium according to claim 1, wherein when a plurality of file information exist, each of which has the usage time zone within which the entered date and time falls, said index information-producing unit produces the index information by associating the keyword with each of the plurality of file information.

6. The computer-readable recording medium according to claim 1, wherein said retrieval unit includes the time width-designating unit to designate a time width with respect to the entered date and time, and wherein when the keyword is entered and the time width is designated, said retrieval unit retrieves the file identification information based on the index and the time width, and the usage time zone at least partly overlaps the time width.

7. The computer-readable recording medium according to claim 1, wherein said index information-producing unit produces the index information by associating the keyword with the file identification information of the file information having the usage time zone which covers a time period from a predetermined time period before the entered date and time to a predetermined time period after the entered date and time.

8. An information search method for searching for desired files, comprising:

detecting a keyword entered by a user;

producing keyword information associating the detected keyword with an entered date and time at which the detected keyword was entered;

storing the produced keyword information;

monitoring a situation in which a file is used, and when the file is opened, detecting an opened date and time at which the file is opened and a closed date and time at which the file is closed;

producing file information associating a usage time zone between the detected opened date and time and the detected closed date and time, during which the file was used, with file identification information identifying the file;

storing the produced file information;

producing index information associating the keyword as a preparation object keyword with the file identification information of the file information having the usage time zone within which the entered date and time falls, based on the entered date and time included in the keyword information produced and stored, and the usage time zone included in the file information;

retrieving the preparation object keyword matching a search object keyword entered by a keyword input operation, and outputting the file identification information associated with the retrieved preparation object keyword; and displaying the outputted file identification information on a screen, wherein:

the index information is produced by adding information of relative time periods with respect to the date and time at which the keyword was entered to the file identification information, and a predetermined time width is designated with respect to the date and time at which the keyword was entered by a time width-selecting operation, and wherein when the search object keyword is entered, and the predetermined time width is designated, the information of relative time periods added to the file identification information of files associated with the preparation object keyword matching the entered search object keyword is referred to, and the file identification information of files in each of which at least part of the relative time period is included within the predetermined time width is outputted as a search result.

9. An information search system, comprising:

a processor; and a memory storing computer-readable instructions, execution of the instructions by the processor configuring the system to include:

a keyword detecting unit to detect a keyword entered by a user;

a keyword information-producing unit to produce keyword information associating the keyword detected by said keyword detecting unit with an entered date and time at which the keyword was entered;

a keyword information-storing unit to store the keyword information produced by said keyword information-producing unit;

a file detecting unit to monitor a situation in which a file is used, and when the file is opened, to detect an opened date and time at which the file is opened and a closed date and time at which the file is closed;

a file information-producing unit to produce file information associating a usage time zone between the opened date and time and the closed date and time detected by said file detecting unit, during which the file was used, with file identification information identifying the file;

a file information-storing unit to store the file information produced by said file information-producing unit;

an index information-producing unit to produce index information associating the keyword as a preparation object keyword with the file identification information of the file information having the usage time zone within which the entered date and time falls, based on the entered date and time included in the keyword information stored in said keyword information-storing unit, and the usage time zone included in the file information stored in said the information-storing unit;

a retrieval unit to retrieve the preparation object keyword matching a search object keyword entered by a keyword input operation from the index information-producing unit, and to output the file identification information associated with the retrieved preparation object keyword; and a display unit to display the file identification information output from said retrieval unit on a screen, wherein:

said index information-producing unit produces the index information by adding information of relative time periods with respect to the date and time at which the keyword was entered to the file identification information, and said retrieval unit includes a time width-designating unit to designate a predetermined time width with respect to the date and time at which the keyword was entered by a time width-selecting operation, and wherein when the search object keyword is entered, and the predetermined time width is designated by said time width-designating unit, said retrieval unit refers to the information of relative time periods added to the file identification information of files associated with the preparation object keyword matching the entered search object keyword, and output the file identification information of files in each of which at least part of the relative time period is included within the predetermined time width, as a search result.

* * * * *